April 20, 1954   G. WALTERS ET AL   2,676,126
BRAKE-LININGS AND METHODS OF MAKING THE SAME
Filed Dec. 23, 1950   7 Sheets-Sheet 1
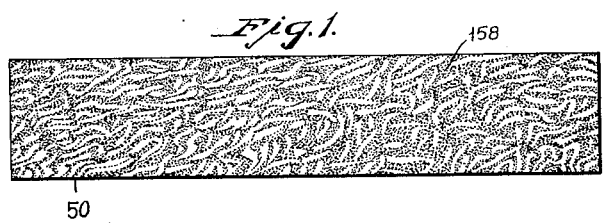
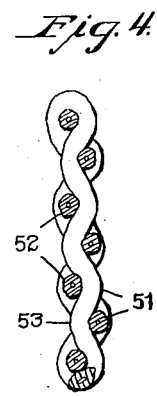
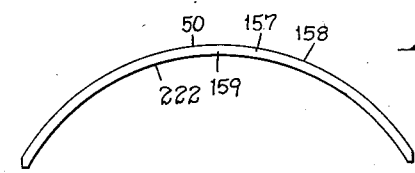
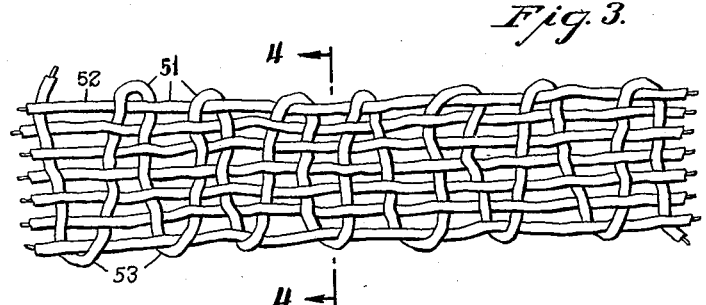
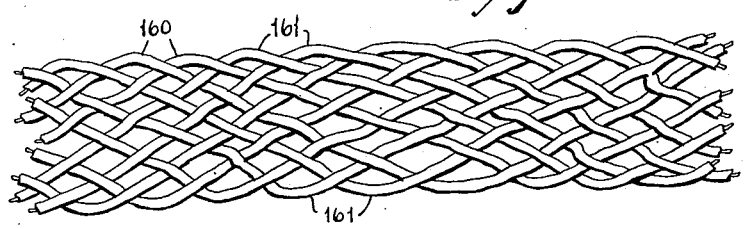
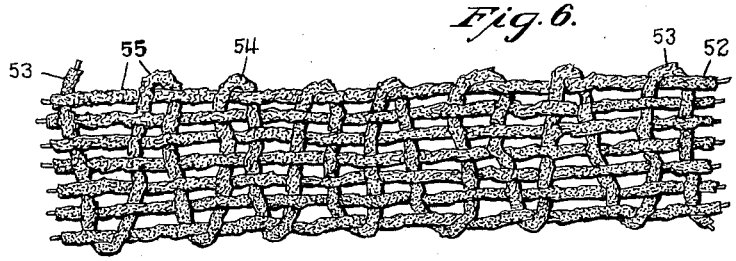
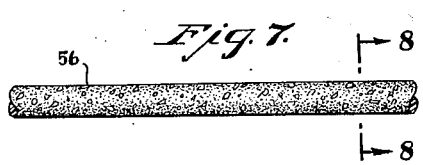
Gustav Walters
Henry Clifford Morton
Inventors
By
Seymour Earle Nichols
Attorneys April 20, 1954  G. WALTERS ET AL  2,676,126
BRAKE-LININGS AND METHODS OF MAKING THE SAME
Filed Dec. 23, 1950  7 Sheets-Sheet 2
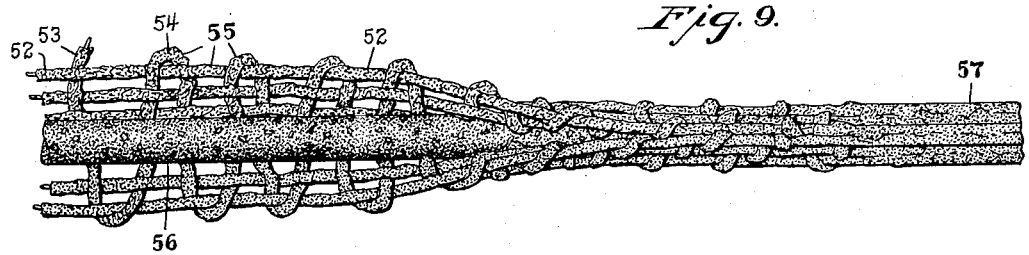
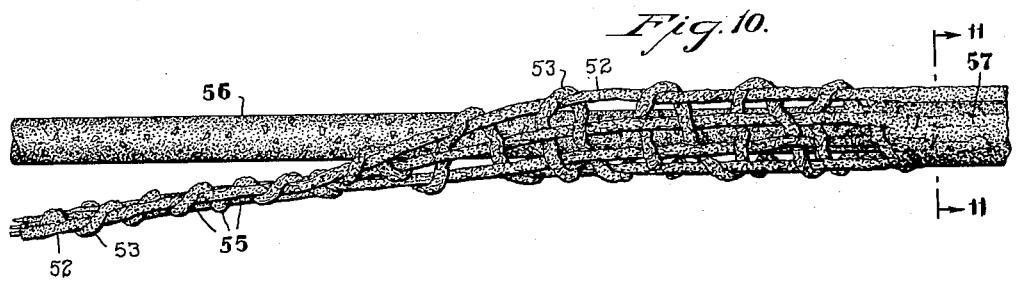
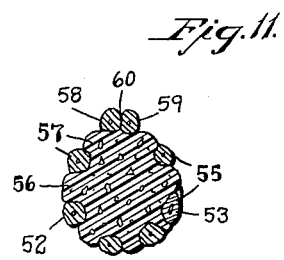
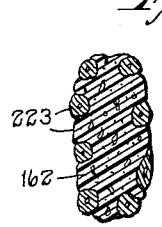
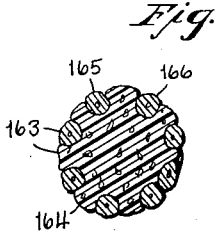
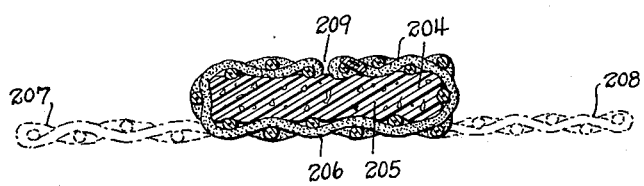
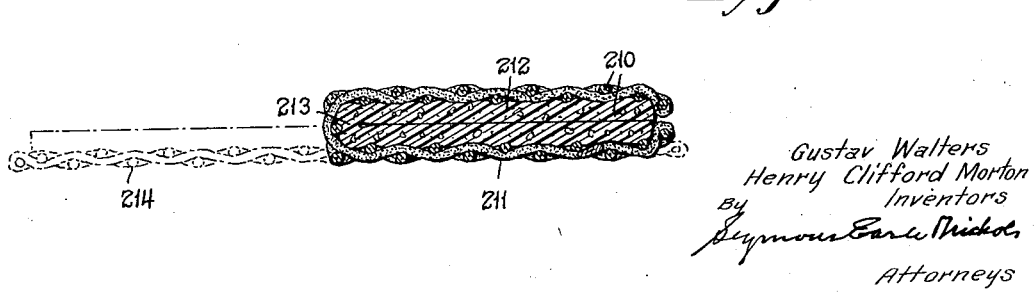

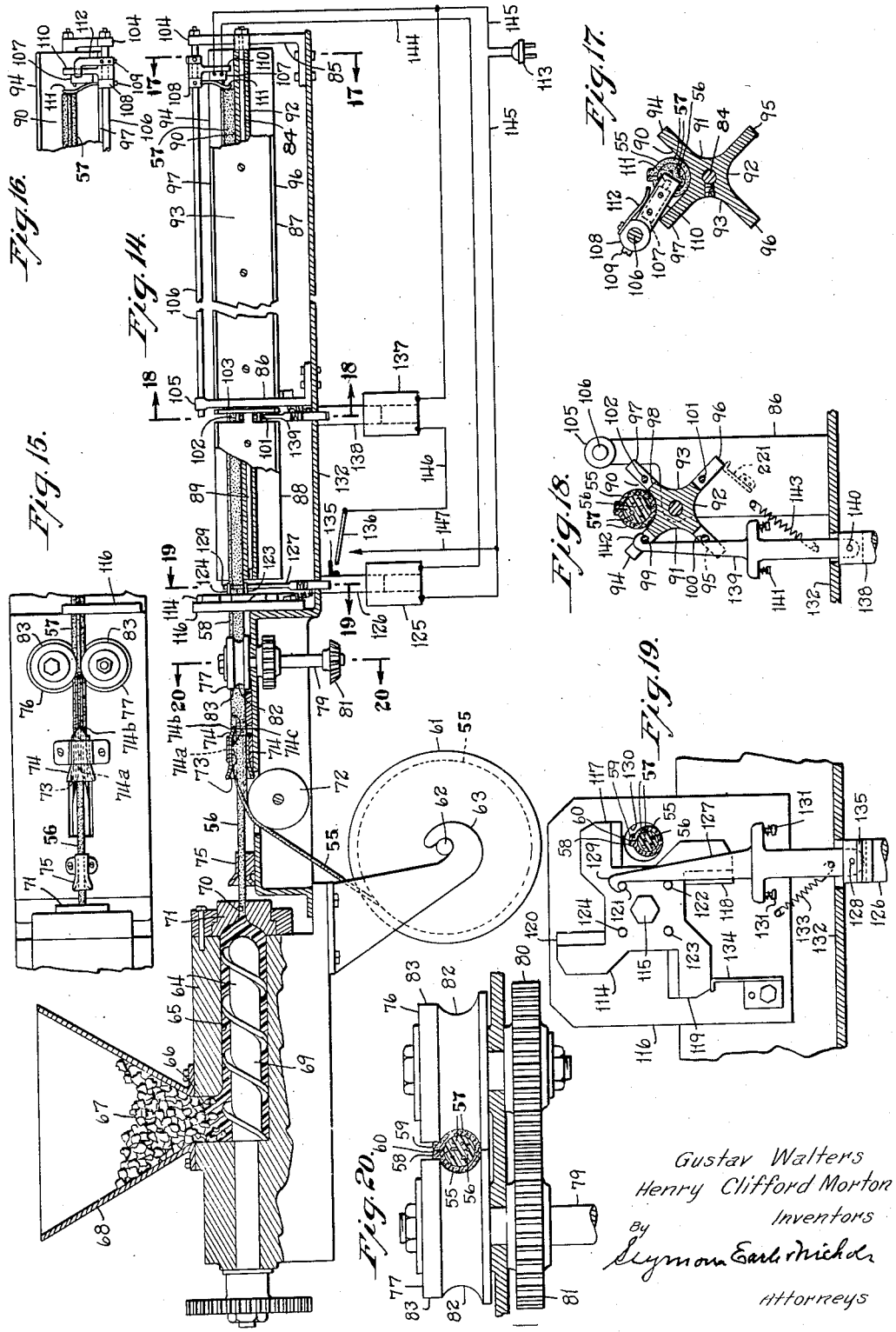

April 20, 1954 G. WALTERS ET AL 2,676,126
BRAKE-LININGS AND METHODS OF MAKING THE SAME
Filed Dec. 23, 1950 7 Sheets-Sheet 4
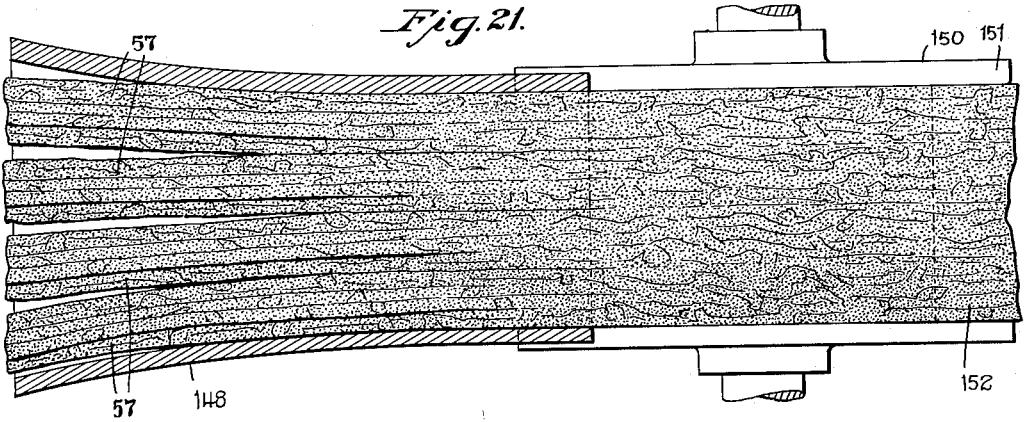
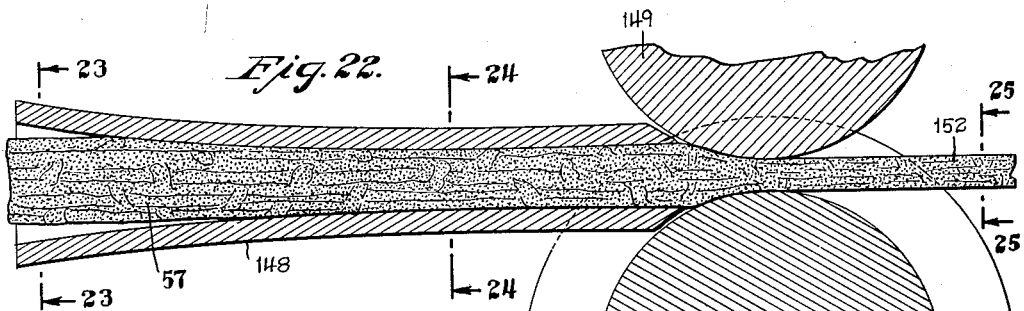
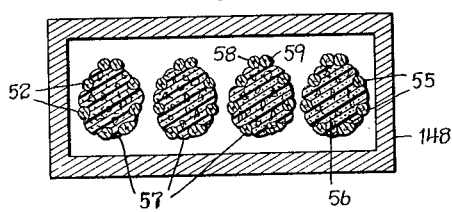
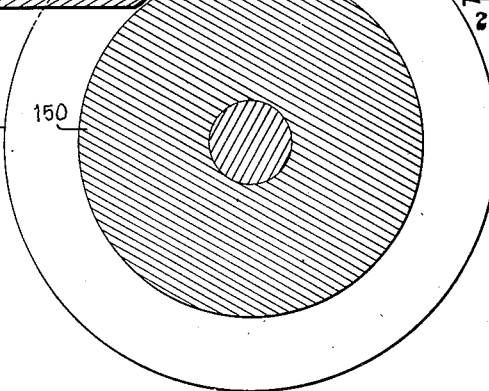
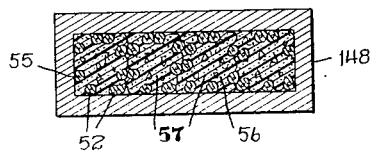
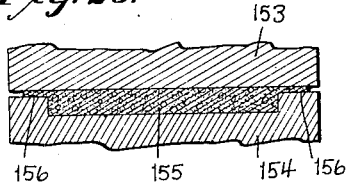
Gustav Walters
Henry Clifford Morton
Inventors
By
Seymour Earle Nichols
Attorneys

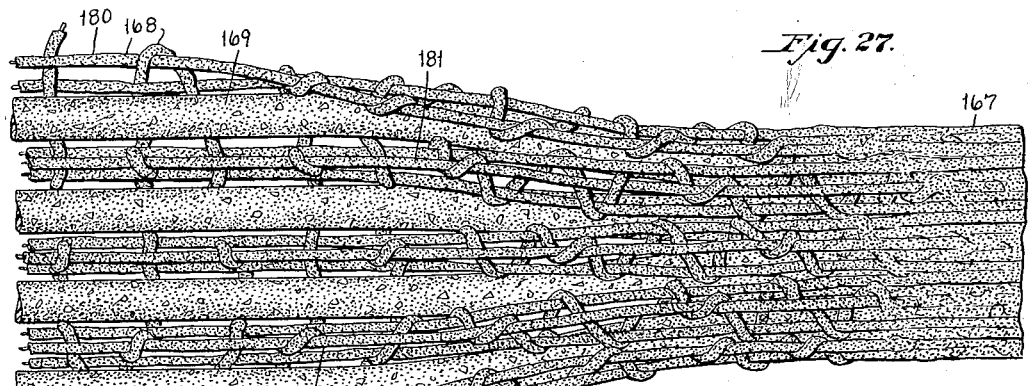
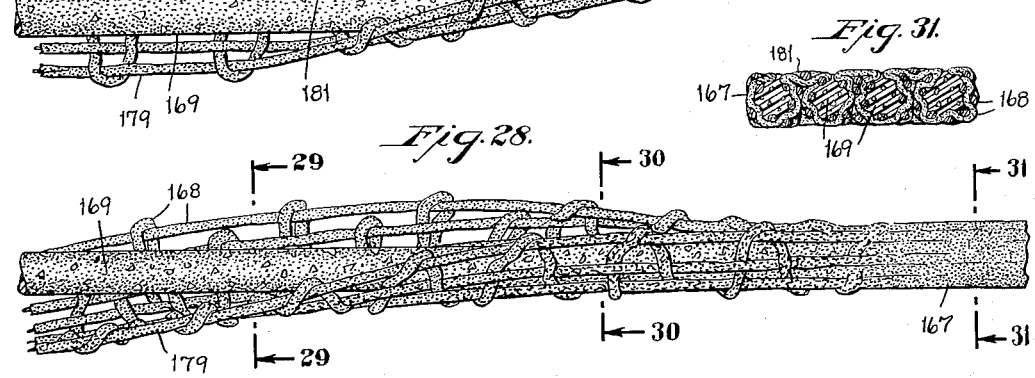
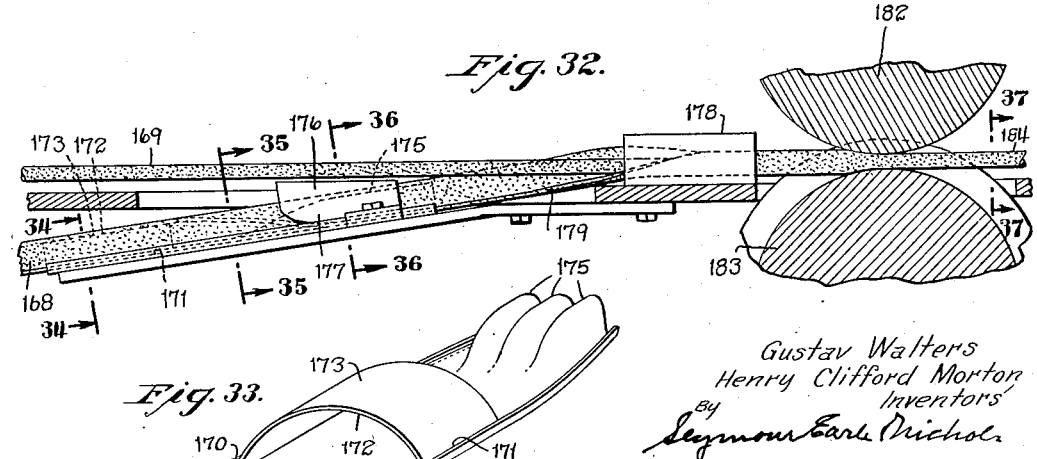

April 20, 1954  G. WALTERS ET AL  2,676,126
BRAKE-LININGS AND METHODS OF MAKING THE SAME
Filed Dec. 23, 1950  7 Sheets-Sheet 7

Gustav Walters
Henry Clifford Morton
Inventors
By
Attorneys

Patented Apr. 20, 1954

2,676,126

UNITED STATES PATENT OFFICE 2,676,126

BRAKE LININGS AND METHOD OF MAKING THE SAME

Gustav Walters, Middletown, and Henry Clifford Morton, Branford, Conn., assignors to The Russell Manufacturing Company, Middletown, Conn., a corporation of Connecticut Application December 23, 1950, Serial No. 202,461

15 Claims. (Cl. 154—81)

This invention relates to improvements in brake-linings or brake friction-strips, and methods of making the same.

One object of this invention is to provide an improved brake-lining in which a large portion of the strength of the lining is provided by strands, and in which a desirable wide range of friction properties is feasibly obtained by employing separately-formed plastic material which permits of uniformly distributing heavy and/or coarse particles of friction-modifying agents through the lining.

Another object of this invention is to provide an improved method of making the herein described brake-lining.

Other objects and advantages will appear to those skilled in the art from the following, considered in conjunction with the accompanying drawings.

In the description and claims, the various parts and steps are identified by specific terms for convenience, but they are intended to be as generic in their application as the prior art will permit.

In the accompanying drawings forming part of the present disclosure, in which certain ways of carrying out the invention are shown for illustrative purposes:

Fig. 1 is a face view of a brake-lining or brake friction-strip made in accordance with this invention;

Fig. 2 is a front elevation of Fig. 1;

Fig. 3 is a face view of a portion of a woven web used for making a brake friction-strip in accordance with this invention;

Fig. 4 is an enlarged transverse sectional view on line 4—4 of Fig. 3;

Fig. 5 is a face view of a modified form of web made by braiding instead of by weaving;

Fig. 6 is a view similar to Fig. 3 of the woven web of Fig. 3 after it has been impregnated with friction material;

Fig. 7 is a face view of a plastic member of friction material which is to be combined with the impregnated web of Fig. 6 to produce a brake friction-strip in accordance with this invention;

Fig. 8 is a transverse sectional view on line 8—8 of Fig. 7;

Fig. 9 is a top plan view illustrating the mode of combining the impregnated web-member of Fig. 6 with the plastic member of Fig. 7 to form a composite member;

Fig. 10 is a front elevation of Fig. 9;

Fig. 11 is an enlarged sectional view on line 11—11 of Fig. 10;

Fig. 12 is a sectional view similar to Fig. 11, of a modified construction;

Fig. 13 is a sectional view similar to Fig. 11 of another modified construction;

Fig. 14 is a schematic side elevation partly in section, illustrating a method of forming the composite member illustrated in Figs. 9, 10 and 11;

Fig. 15 is a top plan view of a portion of Fig. 14;

Fig. 16 is a top plan view of the right-end portion of the construction shown in Fig. 14;

Fig. 17 is a sectional view on line 17—17 of Fig. 14;

Fig. 18 is a sectional view on line 18—18 of Fig. 14;

Fig. 19 is a sectional view on line 19—19 of Fig. 14;

Fig. 20 is a sectional view on line 20—20 of Fig. 14;

Fig. 21 is a top plan view, partly in section, illustrating a method of forming a plurality of composite members similar to the composite member illustrated in Figs. 9, 10 and 11, arranged in side-by-side relation and upon their lower edges, into a brake-lining strip or member;

Fig. 22 is an edge elevation partly in longitudinal section of Fig. 21;

Fig. 23 is a transverse sectional view on line 23—23 of Fig. 22;

Fig. 24 is a transverse sectional view on line 24—24 of Fig. 22;

Fig. 25 is a transverse sectional view on line 25—25 of Fig. 22;

Fig. 26 is a transverse sectional view illustrating the pressing operation employing heat and pressure;

Fig. 27 is a top plan view illustrating a single wide web-member and a plurality of plastic members being formed into a single wide composite member to be later formed into a brake-lining strip or member;

Fig. 28 is a front elevation of Fig. 27;

Fig. 29 is a sectional view on line 29—29 of Fig. 28;

Fig. 30 is a sectional view on line 30—30 of Fig. 28;

Fig. 31 is a sectional view on line 31—31 of Fig. 28;

Fig. 32 is a schematic side elevation, partly in section, illustrating a method of forming the composite member illustrated in Figs. 27 to 31;

Fig. 33 is a perspective view of the forming-plate constituting part of the mechanism illustrated in Fig. 32;

Fig. 45 is a view similar to Fig. 39 illustrating another modified form of composite member;

Fig. 46 is a view similar to Fig. 40 illustrating another modified form of composite member;

Figure 34:
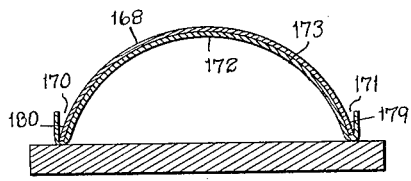
Fig. 34 is a sectional view on line 34—34 of Fig. 32.
Figure 36:
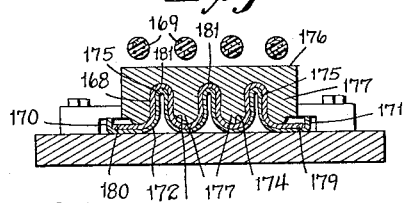
Fig. 36 is a sectional view on line 36—36 of Fig. 32.

Referring to Figs. 1 to 4, 6 to 11, and 21 to 26, showing the particular form of the invention chosen for illustration therein, the brake-lining or friction-strip 50 is made as will presently be set forth. A web is made by loosely weaving an open readily impregnated web or web-member 51 of warp strands 52 and a weft strand or weft picks 53 as illustrated in Figs. 3 and 4. The web 51 is then passed into or through a tank, not shown, containing heat-hardenable plastic bonding friction material 54 to form the impregnated or treated web 55 shown in Fig. 6. No particular bonding friction material is any part of the present invention, and any suitable bonding friction material may be used, such, for example, as bonding friction material containing a phenol-formaldehyde type of resin, as is well known to those skilled in the art. The bonding material initially is in the form of a heavy liquid solution which impregnates and clings to the web, which is then dried.

Also, a heat-hardenable bonding friction material plastic member 56 is molded in any suitable way, of the desired ingredients, as for example, by extruding it through a die. A suitable length of the plastic member 56 is then combined with a suitable corresponding length of the impregnated or treated web 55 in any suitable way as, for example, by successively folding the side-portions of the web 55 about the plastic member 56 by hand or otherwise, to produce a composite member 57 which, throughout its length, is as illustrated in the right-hand end-portions of Figs. 9 and 10, and in the cross-sectional view of Fig. 11. Although the impregnated web-member 55 has been dried before it is combined with the plastic member 56 to form the composite member 57, nevertheless the dried impregnated web-member 55 is pressure-adhesive while cold, so that in addition to the strands of the web-member 55 being readily pressable into the surface of the plastic member 56 as will appear from Fig. 11, the two side edge-portions 58 and 59 are readily pressable by hand or otherwise into adhesive engagement with one another along the location 60, to thus aid in maintaining the members 55 and 56 of the composite member 57 in assembled relation during distortion of the same in performing later steps or operations.

Instead of forming the composite member 57 by hand, it can be formed by means of the mechanism illustrated in Figs. 14 to 20 inclusive. Referring to Fig. 14, a reel 61 containing a reeled-up length of impregnated web 55, has its trunnions 62 removably mounted for rotation in supporting-arms 63.

An extrusion mechanism 64 includes a cylindrical pressing-chamber 65 provided with a throat-entrance 66, through which chunks of plastic material 67 are received from a hopper 68. The pressing-chamber 65 has an extrusion-screw 69 fitting therein, which screw, by rotating, forces the plastic material out through the extrusion-hole 70 in the extrusion-die 71.

The impregnated web 55 is drawn up over the guide-pulley 72 and passes into the flared throat 73 merging into the generally cylindrical passage through a forming-guide 74, which curls the impregnated web up into a generally hollow form around the extruded cylindrical plastic member 56 which comes through the die-opening 70 and through the generally cylindrical guide-passage of a guide 75, and on into the hollow-shaped portion of the impregnated web 55 which is being folded around it and pressed into it, more or less, and then passes between a pair of feeding and pressing-rollers 76 and 77, respectively, mounted on shafts 78 and 79 which are driven at equal speeds by the shaft 79 and spur gears 80 and 81. The shaft 79 may be driven by adjustable mechanism in a way well understood by those skilled in the art, to permit of driving the feed-rolls 76 and 77 at any desired speed to feed the extruded plastic member 56 at the same speed that it is extruded through the die 71. As the plastic member 56 and web-member 55 pass through the forming-guide 74, a holding-finger 74a at the front portion of guide 74 extends down between the edge-portions 58 and 59 of the web-member, and holds the plastic member 56 down below the edges of the edge-portions 58 and 59. And as the plastic and web-members pass out of the rear end of guide 74, the smooth under face of a rear extension 74b thereof holds the top edges of the web 55 at equal heights, and the smooth blunt-pointed rear portion 74c of member 74b holds open, or spreads open if necessary, the edge-portions of the web-member 55, and holds the plastic member 56 down in proper position, so that the edge-portions 58 and 59 of the web-member 55 stand up and apart preparatory to their being engaged by the pressing-rollers 76 and 77. Each of the rollers 76 and 77 has a generally semicircular annular groove 82, which groove, as shown in Fig. 20, gives a generally cylindrical form to the composite member 57, while the cylindrical surfaces 83 on the rollers 76 and 77 press the two edge-portions 58 and 59 together to adhere them together along the location 60 (Figs. 20 and 11).

In order to cut the composite member off into suitable predetermined lengths while it continues to travel and be formed from the previously-formed and dried web 55 and the extruded plastic member 56 as the latter is being made by the extrusion-die, suitable mechanism is provided as will now be described.

A horizontal shaft 84 is rotatably mounted in bearing-supports 85 and 86 and has firmly secured to it by set-screws or otherwise, two trough-sections 87 and 88. And in order to properly support the trough-section 88, the shaft 84 has a rearward shaft-extension portion 89 beyond the bearing-support 86. Both trough-sections are the same in cross section, and each trough-section 87, 88 has four troughs 90, 91, 92 and 93, with four corresponding separating-partitions 94, 95, 96 and 97. Each of the partitions of the trough-section 88 has its end-portion adjacent the bearing-support 86 cut back from its outer edge to a location 98 sufficient to clear the four ratchet-pins 99, 100, 101 and 102, which extend through an end-plate 103 on the end of the trough-section 88 and into the partitions, for a purpose to be later described.

The bearing-supports 85 and 86 respectively have extensions 104 and 105 in which are rigidly secured a switch-support rod 106. A micro-switch 107 is slidable along the support-rod 106 and securable in any desired adjusted position by collars 108 and set-screws 109, or otherwise. A switch-support arm 110 is pivoted to swing on the switch-support rod 106 in a plane at right angles to the support-rod 106 and carries a switch-actuating arm 111 adapted to close the micro-switch 107 to close the electrical circuit leading from a power supply 113 when the end of the composite member 57 pushes the actuating-arm 111.

A cutter 114 is rotatably mounted at 115 on a support 116 and has four cutting-blades 117, 118, 119 and 120. The cutter 114 also has four ratchet-pins 121, 122, 123 and 124. A solenoid-coil 125, when electric current flows through it, draws the solenoid-armature 126 down into the coil 125 and pulls the pawl-arm 127, which is pivoted at 128 on the solenoid-armature, to thus cause pawl-head 129 to pull down on the ratchet-pin 121, to thereby cause the cutter-blade 114 to sever the composite member 57, which is constantly traveling through the opening 130 in the support-plate 116. This downward swinging movement of the ratchet-pin 121 continues until it occupies the position shown by the ratchet-pin 122 in Fig. 19. Spring-pressed buffer-pins 131 engage the upper face of the frame 132 to minimize the shock at the end of the downward movement of the pawl-arm 127. The downward movement of the pawl-arm 127 takes place against the counter-action of the spring 133 which pulls the pawl-arm back up to its original position, as shown in Fig. 19, as soon as the electric current through the solenoid-coil 125 ceases. The leaf-spring lock 134 is secured to the support 116 so that it prevents reverse movement of the cutter 114 by engaging the rear of each cutter-blade after such cutter-blade has been forced past it by the pawl action previously described. The solenoid-armature 126 carries a switch-closing arm 135 which closes the switch 136 when the armature 126 is pulled to its lowered position by the solenoid-coil 125.

A second solenoid-coil 137 is adapted, when supplied with electric current, to pull its solenoid-armature 138 downward and carry along with it the pawl-arm 139 which is pivoted to the armature at 140. The pawl-arm 139 carries spring-pressed buffer-pins 141, which engage against the frame 132 to minimize the shock at the end of the down movement of the pawl-arm 139. When the pawl-arm 139 thus moves downward, its pawl-head 142 pulls the ratchet-pin 99 downwardly to the position occupied by pin 100 in Fig. 18. Upon the electric current being shut off from the solenoid-coil 137, the coil-spring 143 returns the pawl-arm 139 upwardly to its original position shown in Fig. 18, ready for the next downward movement. A leaf-spring lock 221 secured to the support 86 prevents reverse movement of the trough-sections 87, 88 by engaging the rear of each trough-partition after such trough-partition has been forced past it by the pawl action previously described.

When the previously-referred-to engagement of the end of the composite member 57 against the switch-actuating arm 111 takes place, the latter will close the micro-switch 107, to thus close the electric circuit therethrough, whereupon electric current flows through the wires 144 and 145 to the first-described solenoid-coil 125, to cause it to actuate the cutter 114 to sever a length of composite member 57, which is of predetermined length by the particular setting of the micro-switch 107 along the support-bar 106. When this cutting action takes place, the downward movement of the armature 126 causes the closing of the switch 136 as previously described, to thus close the electric circuit through the wires 146 and 147 to cause the second solenoid-coil 137 to pull its armature 138 down, to thus cause the pawl-head 142 to pull one of the four ratchet-pins 99, 100, 101 and 102 downwardly to cause the aligned trough-sections 87 and 88 to be rotated one-quarter of a turn, to thus dump the length of composite member 57 which has been cut, and bring the next-following trough into the position which was previously occupied by the trough which has just been described as having been dumped.

When the trough-sections are rotated one-quarter turn as just described, this causes the switch-supporting arm 110 to be swung about its pivot until the trough-partition which engages the switch-supporting arm 110, pushes past it, whereupon the weight of the switch-arm swings the latter down to its original position with the switch-actuating arm 111 in position to close the micro-switch when the constantly-traveling next section of the composite member 57 pushes against the switch-actuating arm 111, whereupon the cutting and dumping action previously described is again repeated, and so on as long as the composite member continues to be fed along a trough to the location of the micro-switch. To ensure that the switch-supporting arm 110 returns to its operating position after a one-quarter rotation of the trough-sections, a leaf-spring 112 or other resilient means may be provided.

In order to make brake-lining out of the composite member 57 as hereinbefore set forth, a suitable number of dried composite members 57 are passed in side-by-side contact relation with one another through a tapered forming-tube 148 (Figs. 21 and 22) of generally rectangular internal cross-sectional form, which presses the members 57 sidewise together and closes up the spaces between them and somewhat compresses the members 57 down edgewise (Figs. 22 and 24), whereupon the pressed-together members 57 pass between a pair of rolls 149 and 150, the roll 150 of which has a pair of flanges 151 spaced apart the same distance as the width of the pressed-together members 57 as they leave the forming-tube 148. The rolls 149 and 150 press the members 57 down edgewise to a relatively-dense coherent mass forming a strip 152 of the general form illustrated in Fig. 25. The compressed coherent strip 152 is then cut into suitable lengths, each of which is subjected to heat and pressure between die-members 153 and 154 (Fig. 26) to densify and semi-cure the strip 152 into a partly heat-hardened unitary dense member or mass 155 having flash-portions 156, which flash-portions are subsequently trimmed off, whereupon the trimmed members 155 are heated and bent to and held in their final curved forms, such as illustrated in Fig. 2, whereupon they are given the necessary additional heat treatment to completely cure them to final condition, after which they are ground to the finished form illustrated in Figs. 1 and 2. If the brake-lining is to be secured to a brake-shoe by cementing, rivet-holes are not needed, otherwise the lining would be provided with the usual rivet-holes. The arcuate friction or braking-face portion 157 of the brake-lining member 50 (Fig. 2), provides an arcuate braking-face 158 throughout the wear-life of the lining, and the back portion 159 provides the back face 222 which, of course, is not subject to any wear.

Instead of employing a web in which the strands are interlaced by weaving as heretofore described, a web having otherwise interlaced strands as, for example, the braided web 160 shown in Fig. 5 may be made by braiding the strands 161. Before use, the braided web 160 would be impregnated with plastic friction material, the same as in the case of the woven web 51 of Fig. 3. The strands employed in the various forms of the present invention preferably are the usual asbestos strands provided with a core-strand or strands of brass, zinc or other suitable metal.

Instead of making the composite member 57 as illustrated in Figs. 9 to 11, a composite member 223 as illustrated in Fig. 12 could be employed, in which the plastic core-member 162 was originally of an approximate rectangular shape instead of the cylindrical shape of Figs. 9 to 11. Or, a composite member 163 as illustrated in Fig. 13 could be employed, in which the plastic core-member 164 could be cylindrical as in the case of the plastic member of Fig. 11, but of larger size than the plastic member of Fig. 11 as compared to the width of the web-member, so that the two edges 165 and 166 of the web-member are spaced apart somewhat, as shown in Fig. 13.

While it is advantageous to manufacture the composite member by a continuous process as hereinbefore set forth, it will be appreciated that composite members for making brake-lining in accordance with this invention can be made by hand, and even without making the plastic core-member by extruding it. Thus, the core-member, which does not have to be perfectly round or of any particular contour for use in this process, can be made by shaping a plastic mass up into a general rod-like shape by the hands. And then the previously-woven or braided member can be placed about the core-member and pressed thereinto by hand, also. And the thus handmade composite member can be made in any predetermined length desired, or can be made in a long length and cut by hand-operated means or otherwise into the desired length, which can be made into brake-lining in accordance with this invention.

By having the plastic members as hereinbefore set forth, it is possible to have coarse heavy particles such, for example, as brass chips, and also other heavy modifying agents such as particles of lead or other metals or barytes, and so forth, which cannot be satisfactorily maintained properly and uniformly mixed even in a thick liquid such as is employed in passing the web-member through for impregnation. And yet these heavy components, which are very desirable to have present in friction-disks, can be very uniformly distributed through the finished friction-disks, and economically made by the methods hereinbefore set forth, since they will be uniformly distributed throughout the plastic member and yet, when the heat and pressure is applied, the material of the plastic members flows through and between the openings or interstices of the woven or braided members so that the final result is a satisfactorily uniform brake-lining construction.

Instead of employing a composite member of relatively-small volume which requires a number of them to be arranged in side-by-side relation to produce a brake-lining as hereinbefore set forth, the single composite member 167, as illustrated in Fig. 27, can be made from a relatively-wide impregnated web-member 168 combined with a plurality of plastic members 169 to produce the composite member 167. In producing the composite member 167, the web-member and the plastic members are brought into relation with one another as illustrated at the left end of Figs. 27 and 28 and compressed widthwise and thicknesswise as they pass along through mechanism shown in Figs. 32 to 36, so that the composite member changes from the form illustrated at the left of Figs. 27 and 28 and shown in the cross-sectional view of Fig. 29, to the form shown in Fig. 30 and then to the form shown in Fig. 31 and, finally, to the heavily compressed or rolled form shown in Fig. 37, which corresponds to the friction-strip 152 shown in Fig. 25 for the form of the invention illustrated in Figs. 21 to 25.

Thus, referring to Figs. 32 to 37, the wide web-member 168 is of a width to extend down into the side slot-portions 170 and 171 of the forming-plate 172, and is passed along over the upper curved surface 173 of the forming-plate 172 in order to provide a loose quantity of material that can be folded down into the multi-rib shape to take the plurality of plastic members 169 within the upper folds 174 of the web-member 168 without producing an undue degree of side drag on the side edge-portions of the web-member in this folding or rib-forming operation on the web-member. This folding action is brought about by having a plurality of lower folding-fingers 175 on the forming-plate 172, and by having an upper forming-plate 176 provided with a plurality of downwardly-extending fingers 177 which act in cooperation with the lower fingers 175. After the web-member 168 passes beyond the fingers of the forming-plates 172 and 176, the plastic members 169 are brought into the top folds of the web-member as shown in Fig. 29, and then as the web-member and plastic members pass into and through the shaping-tube 178, the side edge-portions 179 and 180 of the web-member 168 are folded up against the sides of the two outside plastic members 169, and the top portions of the upwardly-extending loops 181 are somewhat flattened down, all as shown in Fig. 30, and then as the web and plastic members pass through the end of the shaping-tube 178, the web-member is further compressed and shaped down to the form generally indicated in Fig. 31. And then as the composite member 167 illustrated in Fig. 31 passes through the two rolls 182 and 183, the composite member 167 is squeezed down to the highly-compressed form 184 shown in Fig. 37, which corresponds to the member 152 shown in Fig. 25. The further processing of the member 184 shown in Fig. 37, to a completed brake-lining member, can be the same as was described as concerned the pressed member 152 shown in Fig. 25.

Figure 37:
Fig. 37 is a sectional view on line 37—37 of Fig. 32.
Figure 35:
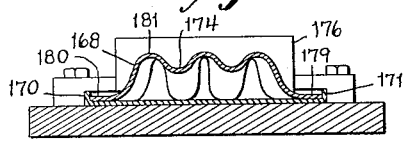
Fig. 35 is a sectional view on line 35—35 of Fig. 32.
Figure 38:
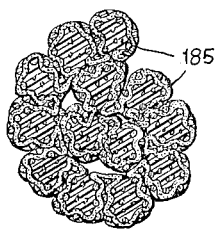
Fig. 38 is a sectional view on an enlarged scale of a modified form of the composite member illustrated in Fig. 31.

Instead of employing a composite member such as 167 illustrated in Fig. 31 to press down into a dense mass or strip 184 as shown in Fig. 37 for later processing into a finished brake-lining, a composite member 185 which would be substantially thinner and wider than the composite member 167 of Fig. 31, could be rolled up as shown in Fig. 38 and then formed by pressure-rolls or otherwise into a dense pressed strip similar to the strip 184 of Fig. 37 for later processing into a brake-lining.

Figure 39:
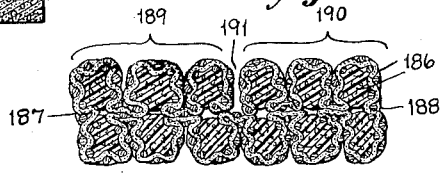
Fig. 39 is a view on an enlarged scale, of a view similar to Fig. 31 of another modified form of composite member.

Another form of composite member could be the composite member 186 illustrated in Fig. 39 which originally would be a strip thinner and wider than the composite member 167 of Fig. 31 and which would be folded at its locations 187 and 188 to swing the fold-portions 189 and 190 upwardly and inwardly to bring their edges adjacent one another at the location 191, and would then be formed into brake-lining in the manner hereinbefore described.

Figure 40:
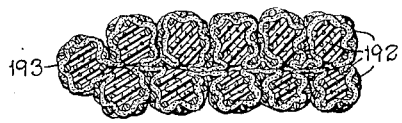
Fig. 40 is a view similar to Fig. 39 of another modified form of composite member.

Another form of composite member 192 is shown in Fig. 40 which is made suitably thin and wide so that when folded at its center portion 193 to produce two layers as illustrated, it provides suitable volume and proportions of web-member and plastic members to be formed into a brake-lining similar to the way hereinbefore set forth.

Figure 41:
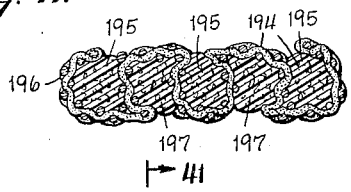
Fig. 41 is a sectional view on line 41—41 of Fig. 42, of another modified form of composite member.
Figure 42:
Fig. 42 is a schematic side elevation, partly in section, illustrating a method of making the form of the composite member illustrated in Fig. 41.

Another form of composite member 194 shown in Fig. 41 looks very similar to the composite member 167 shown in Fig. 31, the main difference being that the three plastic members 195 are located in upper opening folds of the web-member 196, while the other two plastic members 197 are located in lower opening folds of the web-member 196. This can be accomplished as illustrated in Fig. 42 by bringing the upper group of plastic members 195 downwardly toward and into the upper folds of the web-member 196, while at the same time the lower plastic members 197 are brought upwardly to the lower folds thereof, the entire procedure being accomplished in a manner that will be readily understood by those skilled in the art in the light of the herein disclosed methods of producing other forms of the invention.

Figure 43:
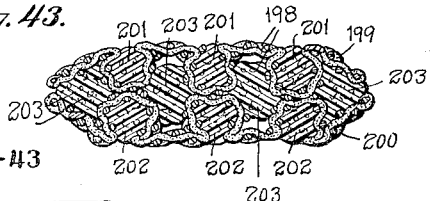
Fig. 43 is a sectional view on line 43—43 of Fig. 44 illustrating another modified form of composite member.
Figure 44:
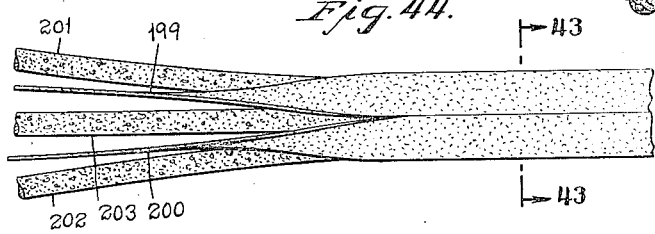
Fig. 44 is a schematic side elevation illustrating a method of making the form of the composite member illustrated in Fig. 43.

In the modified form of composite member 198 shown in Fig. 43, two separate web-members 199 and 200 are employed and are so folded that the upper web-member 199 provides three upper folds in which are located the three plastic members 201, while three plastic members 202 are located in three lower opening folds in the lower web-member 200, and four other plastic members 203 are located in what amounts to equivalents of folds which are formed as a result of the two upper and lower web-members 199 and 200 being located adjacent one another. In making this form of composite member 198, it will be accomplished as illustrated in Fig. 44 by having the three sets of plastic members 201, 202 and 203 brought into the folds of the folded web-members 199 and 200, as illustrated in Fig. 44.

Another way of making a large single composite member is the making of the composite member 204 illustrated in Fig. 45, by employing a single large rectangular plastic member 205 together with a wide web-member 206 which has its opposite side edge-portions 207 and 208 folded up and over toward and adjacent one another at the location 209.

Still another way of making a single large composite member is the composite member 210 illustrated in Fig. 46, which is formed by a relatively-wide web-member 211, upon which is laid or into which is partly pressed a wide plastic member 212, after which the web and plastic member is folded up at the middle along the fold region 213 to bring the left-end portion 214 up on top to its position as illustrated.

Figure 47:
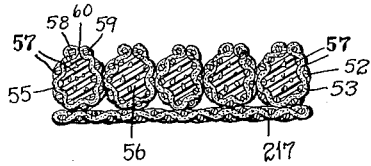
Fig. 47 is a view corresponding to Fig. 23, of a modified construction of brake-lining illustrated in Figs. 47 to 50, but with the forming-tube omitted.
Figure 48:
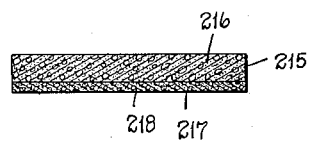
Fig. 48 is a view corresponding to Fig. 26, with the dies omitted and the flash removed, of the modified construction illustrated in Figs. 47 to 50.
Figure 49:
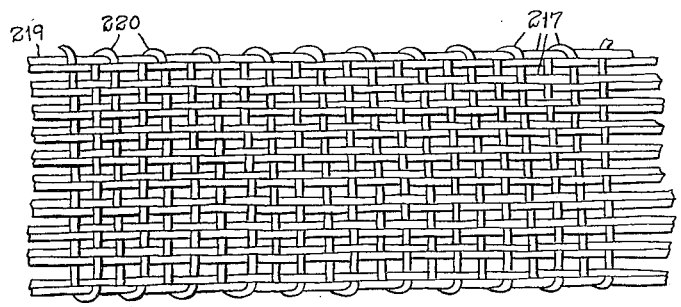
Fig. 49 is a top plan view of the reticular woven bottom member shown as forming the bottom portion of the brake-lining of Figs. 47, 48 and 50.
Figure 50:
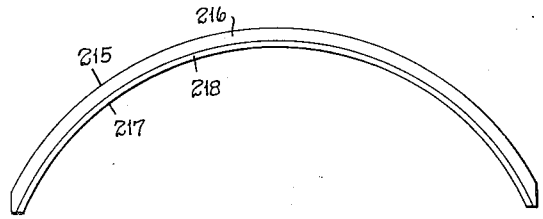
Fig. 50 is an edge elevation similar to Fig. 2, of the modified form of brake-lining illustrated in Figs. 47 to 50.

Instead of having one or more composite web-members form the entire brake-lining strip or member, a brake-lining member 215 (Fig. 48) can be formed by employing a braking-face portion 216 formed of one or more composite members, as hereinbefore set forth, and by employing a reticular backing-member 217 to form the back-face portion 218. The reticular backing-member 217 may be made by weaving longitudinal warp strands 219 with a transverse or weft strand or weft picks 220, the strands 219 and 220 will preferably be of wire-cored asbestos, or of bare wire or of other suitable material. Or the reticular member 217 can be any reticular member having sufficient mechanical strength to prevent possible splitting of the lining by the rivets commonly employed to secure a brake-lining member on a brake-shoe. Fig. 47 corresponds to Fig. 23 of the previously-described form of the invention, with the forming-tube omitted and with the addition of the reticular backing-member 217 at the back thereof. The brake-lining 215 of Fig. 48 corresponds to the similar member illustrated in Fig. 26, but with the dies omitted and the flash removed. Fig. 50 illustrates a side edge view similar to Fig. 2, of the brake-lining member 215 having the reticular reinforcing-member 217 forming the back-face portion 218 thereof. Where a back-face reinforcing-member 217 is employed, it will be made of a thickness in the final brake-lining which will never be reached by a brake-shoe during the wear-life of the brake-lining, so that all the braking action throughout the wear-life of the brake-lining will take place against a portion of the brake-face portion 216 formed of the composite members, which will ordinarily occupy more than half the thickness of the finished brake-lining.

By forming a brake-lining or brake friction-strip of one or more composite members, each of which is formed from one or more plastic members and one or more impregnated web-members, the plastic members being formed separately or independently of the web-members, a number of important advantages are obtained. Thus, great economy of manufacture results. Also, a higher percentage of plastic material can be embodied in, and substantially uniformly distributed through, a brake-lining, than where only one or more impregnated web-members are employed, since only a much smaller percentage of plastic material can be made to adhere to the web by the impregnating treatment. Also, coarse heavy particles such, for example, as brass chips, and also other desirable heavy friction-modifying agents such as particles of lead and other metals and barytes, and so forth, can be easily embodied in a plastic member, although they cannot be easily maintained uniformly mixed in a liquid, even in a thick liquid such as is employed for impregnating web-members. When heat and pressure is applied to the composite members forming the rough friction-strip, the material of the plastic members is forced to flow between the strands and through the openings or interstices of the open web-members, so that the final result is a satisfactorily uniform brake-lining construction.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. A brake friction-strip having an arcuate braking-face portion, and comprising: one or more elongated heat-hardenable composite members extending longitudinally of the strip as a compressed heat-hardened unitary mass, and forming the arcuate braking-face portion of the strip; each said composite member comprising an elongated separately-formed heat-hardenable bonding friction-material plastic member, and an elongated separately-formed heat-hardenable bonding friction-material-impregnated web-member, the web of which is mainly formed of strands, the separately-formed plastic member and the separately-formed web-member of a composite member having been brought into close relation with one another substantially throughout their length to form the composite member.

2. A brake friction-strip having an arcuate braking-face portion, and comprising: one or more elongated heat-hardenable composite members extending longitudinally of the strip as a compressed heat-hardened unitary mass, and forming the arcuate braking-face portion of the strip; each said composite member comprising an elongated separately-formed heat-hardenable bonding friction-material plastic member, and an elongated separately-formed heat-hardenable bonding friction-material-impregnated web-member, the web of which is mainly formed of interlaced strands, the separately-formed plastic member and the separately-formed web-member of a composite member having been brought into close relation with one another substantially throughout their length to form the composite member.

3. A brake friction-strip having an arcuate braking-face portion, and comprising: one or more elongated heat-hardenable composite members extending longitudinally of the strip as a compressed heat-hardened unitary mass, and forming the arcuate braking-face portion of the strip; each said composite member comprising an elongated separately-formed heat-hardenable bonding friction-material plastic member, and an elongated separately-formed heat-hardenable bonding friction-material-impregnated web-member, the web of which is mainly formed of interlaced strands; and the web-member of a composite member having been folded about the plastic member substantially throughout their length to form the composite member.

4. A brake friction-strip having an arcuate braking-face portion, and comprising: a plurality of elongated heat-hardenable composite members extending longitudinally of the strip and in side-by-side relation with one another as a compressed heat-hardened unitary mass, and forming the arcuate braking-face portion of the strip; each said composite member comprising an elongated separately-formed heat-hardenable bonding friction-material plastic member, and an elongated separately-formed heat-hardenable bonding friction-material-impregnated web-member, the web of which is mainly formed of strands, the plastic member and the web-member of a composite member having been brought into close relation with one another substantially throughout their length to form the composite member.

5. A brake friction-strip having an arcuate braking-face portion, and comprising: a plurality of elongated heat-hardenable composite members extending longitudinally of the strip and in side-by-side relation with one another as a compressed heat-hardened unitary mass, and forming the arcuate braking-face portion of the strip; each said composite member comprising an elongated separately-formed heat-hardenable bonding friction-material plastic member, and an elongated separately-formed heat-hardenable bonding friction-material-impregnated web-member, the web of which is mainly formed of interlaced strands, the separately-formed plastic member and the separately-formed web-member of a composite member having been brought into close relation with one another substantially throughout their length to form the composite member.

6. A brake friction-strip having an arcuate braking-face portion, and comprising: a plurality of elongated heat-hardenable composite members extending longitudinally of the strip and in side-by-side relation with one another as a compressed heat-hardened unitary mass, and forming the arcuate braking-face portion of the strip; each said composite member comprising an elongated separately-formed heat-hardenable bonding friction-material plastic member, and an elongated separately-formed heat-hardenable bonding friction-material-impregnated web-member, the web of which is mainly formed of interlaced strands, and the web-member of a composite member having been folded about the plastic member substantially throughout their length to form the composite member.

7. A brake friction-strip having an arcuate braking-face portion, and comprising: a plurality of elongated heat-hardenable composite members extending longitudinally of the strip and in side-by-side relation with one another as a compressed heat-hardened unitary mass, and forming the arcuate braking-face portion of the strip; each said composite member comprising an elongated separately-formed heat-hardenable bonding friction-material plastic member, and an elongated separately-formed heat-hardenable bonding friction-material-impregnated open web-member, the web of which is mainly formed of interlaced strands, and the web-member of a composite member having been folded about the plastic member substantially throughout their length to form the composite member.

8. The method of making a brake friction-strip having an arcuate braking-face, comprising: providing one or more elongated heat-hardenable bonding friction-material plastic members; providing one or more elongated heat-hardenable bonding friction-material-impregnated web-members separately from the plastic members, the web of which is mainly formed of strands; bringing said plastic members and said web-members into close relation with one another substantially throughout their length to form one or more composite members each comprising a said plastic member and a said web-member by causing successive portions of said plastic members to move relatively toward and into close relation with successive pre-made portions of said web-members; arranging one or more composite members longitudinally to form the braking-face portion of the strip; and subjecting said arranged composite members to heat and pressure and forming a unitary brake friction-strip having an arcuate braking-face portion.

9. The method of making a brake friction-strip having an arcuate braking-face, comprising: providing one or more elongated heat-hardenable bonding friction-material plastic members; providing one or more elongated heat-hardenable bonding friction-material-impregnated web-members separately from the plastic members, the web of which is mainly formed of interlaced strands; bringing said plastic members and said web-members into close relation with one another substantially throughout their length to form one or more composite members each comprising a said plastic member and a said web-member by causing successive portions of said plastic members to move relatively toward and into close relation with successive pre-made portions of said web-members; arranging one or more composite members longitudinally to form the braking-face portion of the strip; and subjecting said arranged composite members to heat and pressure and forming a unitary brake friction-strip having an arcuate braking-face portion.

10. The method of making a brake friction-strip having an arcuate braking-face, comprising: providing one or more elongated heat-hardenable bonding friction-material plastic members; providing one or more elongated heat-hardenable bonding friction-material-impregnated web-members separately from the plastic members, the web of which is mainly formed of interlaced strands; folding each web-member of a composite member about a plastic member substantially throughout their length to form one or more composite members each comprising a said plastic member and a said web-member by causing successive portions of said plastic members to move relatively toward and into close relation with successive pre-made portions of said web-members; arranging one or more composite members longitudinally to form the braking-face portion of the strip; and subjecting said arranged composite members to heat and pressure and forming a unitary brake friction-strip having an arcuate braking-face portion.

11. The method of making a brake friction-strip having an arcuate braking-face, comprising: providing one or more elongated heat-hardenable bonding friction-material plastic members; providing one or more elongated heat-hardenable bonding friction-material-impregnated open web-members separately from the plastic members, the web of which is mainly formed of interlaced strands; folding each web-member of a composite member about a plastic member substantially throughout their length to form one or more composite members each comprising a said plastic member and a said web-member by causing successive portions of said plastic members to move relatively toward and into close relation with successive pre-made portions of said web-members; arranging one or more composite members longitudinally to form the braking-face portion of the strip; and subjecting said arranged composite members to heat and pressure and forming a unitary brake friction-strip having an arcuate braking-face portion.

12. The method of making a brake friction-strip having an arcuate braking-face, comprising: causing one or more elongated heat-hardenable bonding friction-material plastic members to travel longitudinally; causing one or more elongated heat-hardenable bonding friction-material-impregnated web-members, the web of which is mainly formed of strands, to travel longitudinally; bringing said traveling plastic members and web-members into close relation with one another substantially throughout their length to form one or more traveling composite members each comprising a said plastic member and a said web-member; cutting off predetermined lengths of said composite members; arranging the composite members longitudinally to form said braking-face portions; and subjecting said arranged composite members to heat and pressure and forming unitary brake friction-strips each having an arcuate braking-face portion.

13. The method of making a brake friction-strip having an arcuate braking-face, comprising: causing one or more elongated heat-hardenable bonding friction-material plastic members to travel longitudinally; causing one or more elongated heat-hardenable bonding friction-material-impregnated web-members, the web of which is mainly formed of interlaced strands, to travel longitudinally; bringing said traveling plastic members and web-members into close relation with one another substantially throughout their length to form one or more traveling composite members each comprising a said plastic member and a said web-member; cutting off predetermined lengths of said composite members; arranging the composite members longitudinally to form said braking-face portions; and subjecting said arranged composite members to heat and pressure and forming unitary brake friction-strips each having an arcuate braking-face portion.

14. The method of making a brake friction-strip having an arcuate braking-face, comprising: causing one or more elongated heat-hardenable bonding friction-material plastic members to travel longitudinally; causing one or more elongated heat-hardenable bonding friction-material-impregnated web-members, the web of which is mainly formed of interlaced strands, to travel longitudinally; folding each web-member of a composite member about a plastic member substantially throughout their length to form one or more traveling composite members each comprising a said plastic member and a said web-member; cutting off predetermined lengths of said composite members; arranging the composite members longitudinally to form said braking-face portions; and subjecting said arranged composite members to heat and pressure and forming unitary brake friction-strips each having an arcuate braking-face portion.

15. The method of making a brake friction-strip having an arcuate braking-face, comprising: causing one or more elongated heat-hardenable bonding friction-material plastic members to travel longitudinally; causing one or more elongated heat-hardenable bonding friction-material-impregnated open web-members, the web of which is mainly formed of interlaced strands, to travel longitudinally; folding each web-member of a composite member about a plastic member substantially throughout their length to form one or more traveling composite members each comprising a said plastic member and a said web-member; cutting off predetermined lengths of said composite members; arranging the composite members longitudinally to form said braking-face portions; and subjecting said arranged composite members to heat and pressure and forming unitary brake friction-strips each having an arcuate braking-face portion.

References Cited in the file of this patent
UNITED STATES PATENTS

| Number | Name | Date |
|---|---|---|
| 1,844,461 | Chase | Feb. 9, 1932 |
| 1,875,645 | Norton | Sept. 6, 1932 |
| 2,025,039 | Cannon | Dec. 24, 1935 |
| 2,196,569 | Stroehla et al. | Apr. 9, 1940 |
| 2,553,698 | Brahs | May 22, 1951 |
| 2,555,261 | Walters | May 29, 1951 |
| 2,584,825 | Walters et al. | Feb. 5, 1952 |